United States Patent
Gaidon et al.

(10) Patent No.: US 9,984,315 B2
(45) Date of Patent: May 29, 2018

(54) ONLINE DOMAIN ADAPTATION FOR MULTI-OBJECT TRACKING

(71) Applicant: Xerox Corporation, Norwalk, CT (US)

(72) Inventors: Adrien Gaidon, Grenoble (FR); Eleonora Vig, Grenoble (FR)

(73) Assignee: Condurent Business Services, LLC, Dallas, TX (US)

(*) Notice: Subject to any disclaimer, the term of this patent is extended or adjusted under 35 U.S.C. 154(b) by 387 days.

(21) Appl. No.: 14/704,350

(22) Filed: May 5, 2015

(65) Prior Publication Data

US 2016/0328613 A1 Nov. 10, 2016

(51) Int. Cl.
*G06K 9/00* (2006.01)
*G06K 9/66* (2006.01)
*G06T 7/246* (2017.01)
*G06T 7/277* (2017.01)

(52) U.S. Cl.
CPC .............. *G06K 9/66* (2013.01); *G06T 7/251* (2017.01); *G06T 7/277* (2017.01); *G06T 2207/20081* (2013.01)

(58) Field of Classification Search
CPC .......... G06K 9/66; G06T 7/277; G06T 7/251; G06T 2207/20081; G06T 7/20
USPC ........................................................ 348/153
See application file for complete search history.

(56) References Cited

U.S. PATENT DOCUMENTS

| | | | |
|---|---|---|---|
| 6,204,813 B1 | 3/2001 | Wadell et al. | |
| 6,567,116 B1 | 5/2003 | Aman et al. | |
| 7,483,049 B2 | 1/2009 | Aman et al. | |
| 8,174,572 B2 | 5/2012 | Buehler et al. | |
| 8,218,011 B2 | 7/2012 | Cheng et al. | |
| 8,467,576 B2 | 6/2013 | Woo et al. | |
| 8,543,563 B1 | 9/2013 | Nikoulina et al. | |
| 8,670,604 B2 | 3/2014 | Eggert et al. | |
| 8,705,793 B2 | 4/2014 | Nevatia et al. | |
| 9,471,847 B2 * | 10/2016 | Zhu | G06K 9/6201 |
| 2011/0135154 A1 | 6/2011 | Wedge | |
| 2011/0242317 A1 * | 10/2011 | Wengrovitz | H04N 7/181 348/143 |
| 2012/0284791 A1 | 11/2012 | Miller et al. | |
| 2013/0177203 A1 | 7/2013 | Koo et al. | |

(Continued)

OTHER PUBLICATIONS

Bach, F. et al., "Non-strongly-convex smooth stochastic approximation with convergence rate O(1/n)," Advances in Neural Information Processing System 26 (2013) pp. 773-781.

(Continued)

*Primary Examiner* — Christopher S Kelley
*Assistant Examiner* — Matthew Kwan
(74) *Attorney, Agent, or Firm* — Kermit D. Lopez; Luis M. Ortiz; Ortiz & Lopez, PLLC (57) ABSTRACT

Methods and systems for online domain adaptation for multi-object tracking. Video of an area of interest can be captured with an image-capturing unit. The video (e.g., video images) can be analyzed with a pre-trained object detector utilizing online domain adaptation including convex multi-task learning and an associated self-tuning stochastic optimization procedure to jointly adapt online all trackers associated with the pre-trained object detector and a pre-trained category-level model from the trackers in order to efficiently track a plurality of objects in the video captured by the image-capturing unit.

20 Claims, 5 Drawing Sheets

(56) References Cited

U.S. PATENT DOCUMENTS

| | | | |
|---|---|---|---|
| 2013/0262106 A1 | 10/2013 | Hurvitz et al. | |
| 2014/0133703 A1 | 5/2014 | Dogra et al. | |
| 2014/0200878 A1 | 7/2014 | Mylonakis et al. | |
| 2014/0344193 A1* | 11/2014 | Bilenko | G06N 99/005 706/12 |
| 2015/0294192 A1* | 10/2015 | Lan | G06K 9/6269 382/159 |

OTHER PUBLICATIONS

Bernardin, K. et al., "Evaluating Multiple Object Tracking Performance: The CLEAR MOT Metrics," EURASIP Journal on Image and Video Processing (2008) 10 pages.

Breitenstein, M. D. et al., "Online Multi-Person Tracking-by-Detection from a Single, Uncalibrated Camera," IEEE Transactions on Pattern Analysis and Machine Intelligence (2010) 33(9):1820-1833.

Cinbis, R. G. et al., "Segmentation Driven Object Detection with Fisher Vectors," IEEE International Conference on Computer Vision (2013) Sydney, Australia, Dec., pp. 2968-2975.

Collins, R. T. et al., "Hybrid Stochastic / Deterministic Optimization for Tracking Sports Players and Pedestrians," 13th European Conference, Zurich, Switzerland, Sep. 6-12, 2014, Proceedings, Part II, pp. 298-313.

Crammer, K. et al., "Online Passive-Aggressive Algorithms," Journal of Machine Learning Research (2006) 7:551-585.

Dalal, N. et al., "Histograms of Oriented Gradients for Human Detection," IEEE Computer Society Conference on Computer Vision and Pattern Recognition (2005) San Diego, CA, Jun. 25, pp. 886-893 vol. 1.

Everingham, M. et al., "The Pascal Visual Object Classes (VOC) Challenge," Int. J. Comput. Vis. (2010) 88:303-338.

Evgeniou, T. et al., "Regularized Multi-Task Learning," Proceedings of the tenth ACM SIGKDD international conference on Knowledge discovery and data mining (2004) pp. 109-117.

Fan, R.-E. et al., "LIBLINEAR: A Library for Large Linear Classification," Journal of Machine Learning Research (2008) 9:1871-1874.

Gaidon, A. et al., "Multi-Object Tracking with Generic Object Proposals," Invention Disclosure (2014) Xerox, 6 pages.

Gaidon, A. et al., "Self-learning Object Detectors for Unlabeled Videos using Multi-Task Learning of an Ensemble of Trackers," Invention Disclosure (2013) Xerox, 9 pages.

Geiger, A. et al., "Are we ready for Autonomous Driving? The KITTI Vision Benchmark Suite," IEEE Conference on Computer Vision and Pattern Recognition (2012) Providence, RI, Jun. 16-21, pp. 3354-3361.

Geiger, A. et al., "3D Traffic Scene Understanding from Movable Platforms," IEEE Transactions on Pattern Analysis and Machine Intelligence (2013) 36(5):1012-1025.

Hall, D. et al., "Online, Real-Time Tracking Using a Category-to-Individual Detector," ECCV 2014, Part I, pp. 361-376.

Isard, M. et al., "Condensation—Conditional Density Propagation for Visual Tracking," International Journal of Computer Vision (1998) 29(1):5-28.

Kalal, Z. et al., "Tracking-Learning-Detection," IEEE Transactions on Pattern Analysis and Machine Intelligence (2010) 6(1):1-14.

Luo, W. et al., "Bi-label Propagation for Generic Multiple Object Tracking," IEEE Conference on Computer Vision and Pattern Recognition (2014) Jun. 23-29, Columbus, OH, pp. 1290-1297.

Malisiewicz, T. et al., "Ensemble of Exemplar-SVMs for Object Detection and Beyond," Proceedings of the 2011 International Conference on Computer Vision, pp. 89-96.

Milan, A. et al., "Continuous Energy Minimization for Multi-Target Tracking," IEEE Transactions on Pattern Analysis and Machine Intelligence (2014) 36(1):58-72.

Perronnin, F. et al., "Fisher Kernels on Visual Vocabularies for Image Categorization," IEEE Conference on Computer Vision and Pattern Recognition (2007) Minneapolis, MN, Jun. 17-22, pp. 1-8.

Pirsiavash, H. et al., "Globally-Optimal Greedy Algorithms for Tracking a Variable Number of Objects," IEEE Conference on Computer Vision and Pattern Recognition (2011) pp. 1201-1208.

Rumelhart, D. E. et al., "Learning representations by back-propagating errors," Nature (1986) 323:533-536.

Tang, K. et al., "Shifting Weights: Adapting Object Detectors from Image to Video," Advances in Neural Information Processing Systems 25 (2012) pp. 647-655.

Wang, M. et al., "Transferring a Generic Pedestrian Detector Towards Specific Scenes," IEEE Conference on Computer Vision and Pattern Recognition (2012) Providence, RI, Jun. 16-21, pp. 3274-3281.

Wang, X. et al., "Scene-Specific Pedestrian Detection for Static Video Surveillance," IEEE Transactions on Pattern Analysis and Machine Intelligence (2014) 36(2):361-374.

* cited by examiner

ONLINE DOMAIN ADAPTATION FOR MULTI-OBJECT TRACKING

TECHNICAL FIELD

Embodiments are generally related to the field of object detection in video data. Embodiments are additionally related to the fields of Multi-Object Tracking (MOT) and Tracking-By-Detection (TBD).

BACKGROUND OF THE INVENTION

One of the objectives of object tracking is to determine the size and location of a target object in a sequence of video frames, given the initial state of the target. This is important for a variety of applications, including the ability to efficiently and accurately track, for example, pedestrians in railway stations and airports, monitor vehicles on the road, along with faces for interfacing people and computers, and so on.

One important and yet difficult aspect of object tracking involves the automatic analysis of video data. In particular, problems are inherent in present Multi-Object Tracking (MOT) applications, which involve automatically detecting and tracking multiple objects of a known category in videos. The main paradigm for object tracking in monocular video streams is Tracking-By-Detection (TBD), which relies on a target class-specific object detector, and often boils down to optimally linking detections into tracks, a procedure known as Association-Based-Tracking (ABT). These methods directly rely on the recent progress on object detection. However, the available pre-trained detector might not always be optimal in practice.

Existing causal TBD algorithms propagate the previously detected location of a variable number of targets forward in time via target-specific appearance and motion models. Therefore, TBD depends first and foremost on an accurate object detector. An accurate appearance model might, however, not always be available in real-world applications, because of practical constraints (e.g., speed, hardware, or laws), by lack of related training data (e.g., prohibitive data collection costs), or for rare categories. Essentially, this is a typical domain adaptation problem, in which a detector pre-trained in the source domain will most likely perform sub-optimally in the target domain.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for object detection in video data It is another aspect of the disclosed embodiments to provide for an online domain adaptation method and system for multi-object tracking.

The aforementioned aspects and other objectives and advantages can now be achieved as described herein. Methods and systems for online domain adaptation for multi-object tracking are disclosed. Video of an area of interest can be captured with a video camera. The video (e.g., video images) can be analyzed with a pre-trained object detector utilizing online domain adaptation including convex multi-task learning and an associated self-tuning stochastic optimization procedure to jointly adapt online all trackers associated with the pre-trained object detector and a pre-trained category-level model from the trackers in order to efficiently track a plurality of objects in the video captured by the video camera.

Embodiments involve multi-object tracking-by-detection beginning with a suboptimal pre-trained category-level object detector. Previous work in MOT investigated detector adaptation or on-line learning of appearance models, but not both jointly. The disclosed approach is a generalization adapting from category to instances and back, wherein: (i) all target models are jointly learned by adapting them from the pre-trained model; and (ii) the pre-trained model is adapted online.

The disclosed multi-task formulation enforces parameter sharing between all models to reduce model drift and robustly handle false alarms, while allowing for continuous domain adaptation to gradually decrease missed detections. More specifically, updating all target-specific appearance models jointly through a multi-task learning objective promotes similarity between individual models and, hence, prevents over fitting to individual object appearances. By modeling the latent commonalties in appearance, the drift of the category model will be greatly limited. A limitation of the model drift is also possible due to the continuous adaptation to both the data stream and to other instances. As a consequence, the learned models will be more robust to false alarms, which tend to significantly differ from the model average.

A second aspect of the disclosed embodiments is the self-tuning of hyper-parameters involved in jointly learning target-specific and category-level appearance models. Selecting the optimal parameter values, such as the learning rate and regularization factors, is especially critical in the disclosed unsupervised online scenarios, wherein appearance models need to be updated instantaneously to adapt to the non-stationary video stream. In contrast to existing TBD approaches, the disclosed approach does not assume stationary and manually fixed parameters per video, but self-tunes parameters with a greedy approach per-frame and per-target. Such a self-tuning procedure not only yields improvements in the tracking performance, but also is efficient as it reuses frame-level computations.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Figure 1:
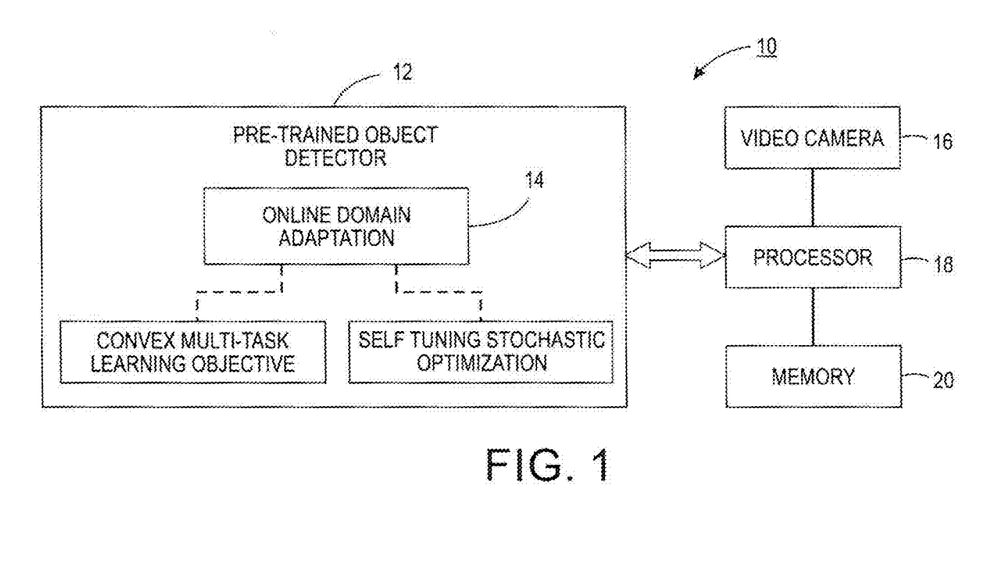
FIG. 1 illustrates a block diagram of a system for online domain adaptation for multi-object tracking, in accordance with a preferred embodiment.

FIG. 1 illustrates a block diagram of a system 10 for online domain adaptation for multi-object tracking, in accordance with a preferred embodiment. The word "online" utilized herein means that during tracking only the information from the previous frames and up to the current frame are used for inference at any given time instance. System 10 generally includes a suboptimal pre-trained object detector module 12 (also referred to as an object detector) that utilizes an online domain adaptation strategy 14, from category to instances, and back. The online domain adaptation strategy 14 follows a convex multi-task learning objective and an associated self-tuning stochastic optimization procedure to jointly adapt online (i) all trackers from the pre-trained generic detector 12 (category-to-instance), and (ii) a pre-trained category-level model from the trackers (instance-to-category). This approach is causal, applicable to any features and linear object detectors, and also does not require access to a large set of labeled samples, while also capable of outperforming tracking approaches on, for example, a public benchmark.

Note that the multi-task learning objective and the optimization procedure can each be implemented as modules or sub-modules of the online domain adaptation 14, which also may be implemented in the context of a module as part of the object detector module 12. The object detector or module 12 can communicate with one or more of a processor 18, a memory 20, and a video camera 16 (e.g., one or more cameras). In some instances, as will be explained in greater detail here, the module(s) 12 may be stored in memory 20 and retrieved for processing via processor 18. The processor 18 may process video data captured by video camera(s) 16 based on instructions provided by, for example, module 12.

As indicated previously, existing causal TBD algorithms involve propagating the previous detected location of a variable number of targets forward in time via target-specific appearance and motion models. Therefore, TBD applications depend first and foremost on the use of an accurate object detector. An accurate appearance model might, however, not always be available in real-world applications because of practical constraints (e.g., speed, hardware, or laws), a lack of related training data (i.e., prohibitive data collection costs), and for other potential rare categories. Essentially, this is a typical domain adaptation problem in which a detector that was pre-trained in the source domain will most likely perform sub-optimally in the target domain.

The disclosed embodiments thus implement multi-object tracking-by-detection starting with a suboptimal pre-trained category-level object detector 12. The disclosed approach thus involves the joint implementation of detector adaptation and on-line learning of appearance models. This approach can be generalized by going from category to instances and back. That is, all target models can be jointly learned by adapting from a pre-trained model. The pre-trained model can be adapted online.

First, it can be demonstrated that the disclosed multi-task formulation enforces parameter sharing between all models to reduce model drift and robustly handle false alarms, while allowing for continuous domain adaptation to gradually decrease missed detections. More specifically, updating all target-specific appearance models jointly and via a multi-task learning objective can promote similarity between individual models and, hence, prevents over fitting to individual object appearances. Indeed, by modeling the latent commonalties in appearance, the drift of the category model can be greatly limited. Limitations of the model drift are also possible due to the continuous adaptation to both the data stream and to other instances. As a consequence, the learned models will be more robust to false alarms, which tend to significantly differ from the model average.

A second component of the disclosed embodiments involves the self-tuning of hyper-parameters employed in jointly learning target-specific and category-level appearance models. Selecting the optimal parameter values, such as the learning rate and regularization factor, are especially critical in the unsupervised online scenario, wherein appearance models need to be updated instantaneously to adapt to the non-stationary video stream. In contrast to existing TBD approaches, the disclosed approach does not assume stationary and manually fixed parameters per video, but self-tune parameters with a greedy approach per-frame and per-target. It can be shown that such a self-tuning procedure not only yields improvements in the tracking performance, but is also efficient because the model leverages frame-level computations.

The disclosed approach can be referred to as ODAMOT (Online Domain Adaption for Multi-Object Tracking), which combines category-to-instance tracker adaptation with a novel (i) Multi-task learning formulation and (ii) modules for online domain adaptation of the generic detector. This approach is the first MOT approach to perform online domain adaptation of the category-level detector.

The examples disclosed herein illustrate applications of high-level video analytics, which can rely on a core computer vision component based on object detection and tracking. Therefore, the disclosed embodiments can provide a high enough accuracy, while simultaneously reducing setup and operational costs.

We begin by describing a causal multi-target TBD framework that combines a detector with per-target appearance and motion models to track a variable number of objects in a monocular video. The online multi-task learning of the instance trackers and the domain adaptation of the category-level detector is then described, followed by an explanation of a stochastic self-tuning optimization procedure.

A key ingredient of a framework is an object detector pre-trained for the category of interest (e.g., cars or persons). To obtain such a generic detector, a detector can be first pre-trained offline using a general-purpose labeled dataset, such as, for example, Pascal VOC or ImageNet. For learning, a detector learning approach can be employed based on logistic regression and hard negative mining, as briefly described below.

Image windows can be scored with a category-specific linear classifier parameterized by a vector $w \in R^d$ learned via logistic regression. The classifier returns the probability that a candidate window x, represented by a feature vector $\phi_t(x) \in R^d$, contains an object of the category of interest in frame $z_t$ by:

$$P(x|z_t;w)=(1+e^{-w^T\phi_t(x)})^{-1} \quad (1)$$

Note that w is not a random variable, but a deterministic parameter. The model w can be estimated via logistic regression, a regularized empirical risk minimization algorithm based on the logic loss:

$$l_i(x,y,w)=\log(1+\exp(-yw^T\phi_t(x))) \quad (2)$$

This gives calibrated probabilities with Equation (1) and enjoys useful theoretical properties for online optimization.

Figure 2:
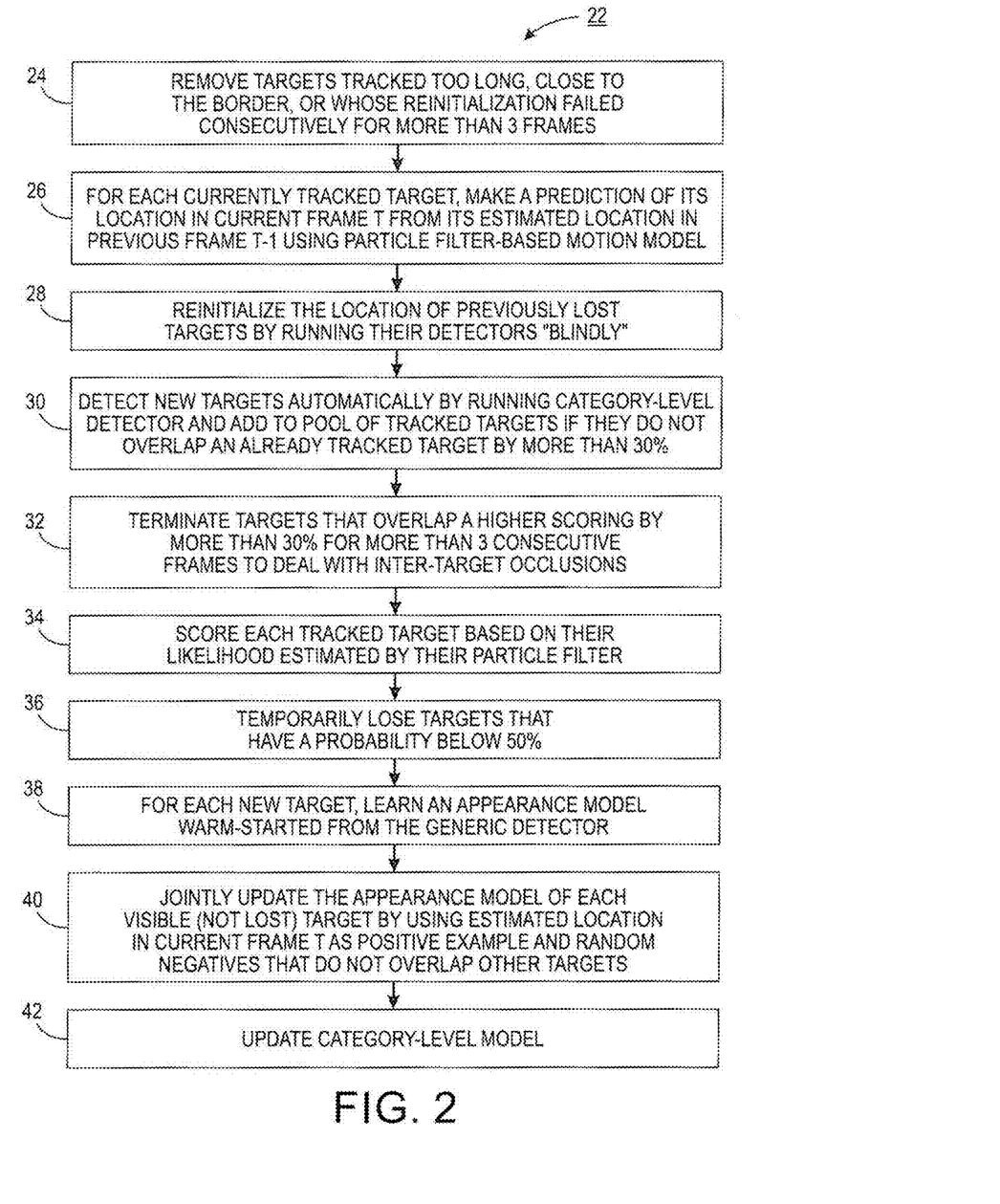
FIG. 2 illustrates a high-level flow chart of operations depicted logical operational steps of a method for online multi-target tracking, in accordance with a preferred embodiment.
Figure 3:
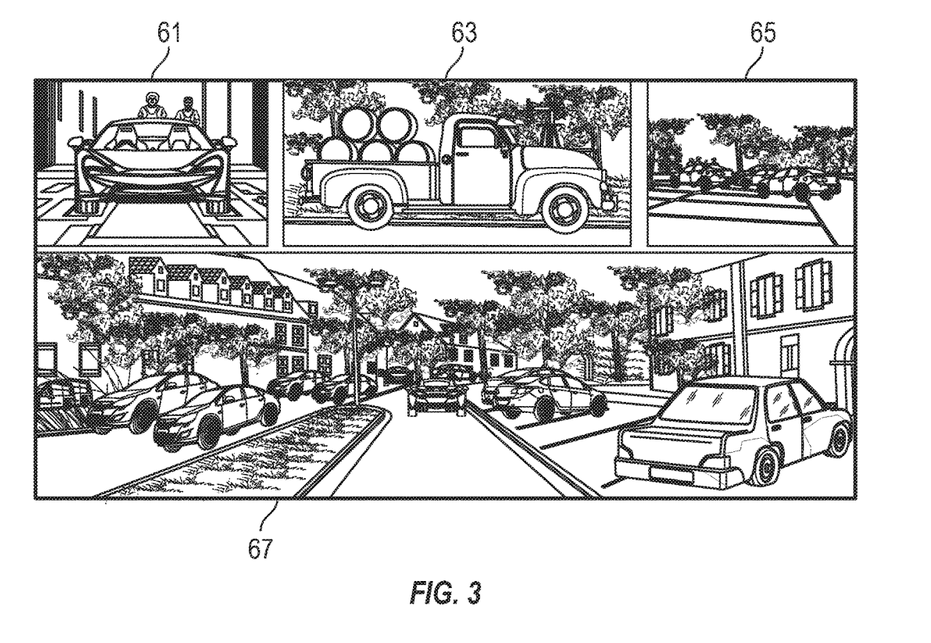
FIG. 3 illustrates an example pseudo-code for a ODA-MOT algorithm, which can be implemented in accordance with an alternative embodiment.

FIG. 2 illustrates a high-level flow chart of operations depicted logical operational steps of a method 22 for online multi-target tracking, in accordance with a preferred embodiment. Note that in the online tracking phase, the operations shown in FIG. 2 can be performed in each frame t of a video stream (see FIG. 3 for a high-level pseudo code description of the disclosed ODAMOT). As shown at block 24 of method 22, a step or logical operation can be performed to remove targets that have been tracked for too long, which are close to the border, or whose re-initialization failed consecutively for more than 3 frames. Thereafter, as depicted at block 26, for each currently tracked target, a prediction can be made regarding its location in the current frame t from its estimated location in the previous frame t-1 by using a particle filter-based motion model.

Then, as indicated at block 28, a step or operation can be implemented to reinitialize the location of previously lost targets by running their detectors "blindly", i.e., without using their previous locations in past frames. Next, as shown at block 30, a step or logical operation can be implemented to detect new targets automatically by running the category-level detector and add such targets to the pool of tracked targets if they do not overlap an already tracked target by more than 30%.

Thereafter, as depicted at block 32, a step or logical operation can be implemented to deal with inter-target occlusions by terminating targets that overlap a higher scored target by more than 30% for more than 3 consecutive frames. Then, as illustrated at block 34, a step or logical operation can be provided to score each tracked target based on their likelihood estimated by their particle filter. Next, as depicted at block 36, a step or logical operation can be implemented to temporarily lose targets that have a probability below 50%. Then, as indicated at block 38, a step or logical operation can be implemented wherein for each new target an appearance model can be learned that is "warm-started" from the generic detector.

Next, as shown at block 40, a step or logical operation is provided to jointly update the appearance model of each visible (i.e., not lost) target by using the estimated location in the current frame t as a positive example and random negatives that do not overlap other targets. Finally, as illustrated at block 42, a step or logical operation can be implemented in which the category-level model is updated.

Below is an example ODAMOT algorithm, which can be implemented in accordance with an alternative embodiment. It can be appreciated that the ODAMOT algorithm shown below is not a limiting feature of the disclosed embodiments but is disclosed for exemplary and illustrative purposes only.

```
 1: Input: pre-trained generic detector w, video stream
 2: Output: adapted generic detector w̄^(tend), list of tracks W
 3: Initialization: w̄^(t0) = w, W = 4:
 4: while video stream is not finished do
 5:    Remove invalid targets
 6:    for each target i in Wdo
 7:       Update i's location by propagating its previous
          location in frame t-1 through
          a motion model
 8:    end for
 9:    Detect new targets not in W from the generic
       detector in current frame t
10:    for each new target do
11:       Add to pool of tracked targets W
12:    end for
13:    Merge overlapping tracks in W
14:    for each target i in W do
15:       if i is a new target then
16:          Learn initial detector w̄_i^(t-1) warm-started from w̄_i^(t-1)
             with random negatives
17:       end if
18:       Run the detector w̄_i^(t-1)
19:       if objecct i is lost then
20:          Remove i from W
21:       else
22:          Get {(x_k^(i), y_k^(i)), k = 1 : n_i} from the detections
             (jittered positives and hard negatives)
23:          Update detector w_i^(t)
24:       end if
25:    end for
26:    Update generic detector w̄^(t)
27: end while
```

The first category-to-instance adaptation happens upon the creation of a new track (creation of a new target). In addition to initializing the target location from a top detection, in frame $t_0$, the optimization of the target-specific appearance model $w_i^{(t_0)}$ can be "warm-started" or subject to a "warm-start" from the category level one $w^{(t_0)}$: $w_i^{(t_0)} = w^{(t_0)}$.

Warm-starting in this manner allows for initiating the optimization of a target's model close to an already good solution, as it was used to detect the initial location of the target. This yields two positive effects: faster convergence and stronger regularization. Therefore, warm-starting effectively mitigates the lack of training data due to the causal nature of our tracker, where we learn models from a single frame at a time.

Note that this intuitive strategy is allowed by the fact that both the category- and instance-level object detectors rely on the same architecture (i.e., the same features and type of linear classifier). Warm-starting is not so straightforward in common TBD approaches, which generally rely on incompatible features and classifiers (e.g., HOG+SVM and boosted cascades on low-level features).

The second adaptation from category to instances relies on the observation that all targets should share features, because they belong to the same category. To that end, the disclosed embodiments update all target models jointly using a multi-task learning objective discussed earlier with respect to FIG. 1. Thus, the variable $N_t$ can be the number of object instances tracked at time t. Each target i=1, ..., $N_t$ has a location prediction $\hat{x}_t^{(i)}$ made by its associated tracker in frame t and a learned appearance model $w_i^{(t-1)}$. The goal is to update this appearance model $w_i^{(t-1)} \rightarrow w_i^{(t)}$ with the new data from time t by using the predicted location. Next, $\{x_k^{(i)}, k=1, \ldots u_i\}$ can be the $n_i$ training samples of object i in frame t.

Positive samples can be generated by applying translation and scaling operations to $\hat{x}_t^{(1)}$ such that there is an overlap by at least 95%. Negative samples can be obtained by adopting a standard hard negative mining strategy by running the current version of the detector $w_t^{(t-1)}$ in frame t. The labels can be inferred by using a common "no teleportation and no cloning" assumption on each target individually: only $\hat{x}_t^{(i)}$ is correct and all other high-scoring detection candidates are hard negatives. Note that mining these negatives is only possible at the individual instance level, as hard negatives at the category level might in fact be missed detections. Finally, negative samples overlapping any other object j≠i currently tracked are not used for that target i.

Next, $W^{(t)} = \{w_1^{(t)}, \ldots w_{N_i}^{(t)}\}$ represents the stacked target models and $(X^{(t)}, y^{(t)})$ represents the training samples and labels mined for all targets in frame t. Updating all appearance models jointly amounts to minimizing the following regularized empirical risk as indicated by Equation (3):

$$W^{(t)} = \arg\min_w L_t(X^{(t)}, y^{(t)}, W) + \lambda \Omega_t(W) \quad (3)$$

The loss $L_t$ can be defined as shown in Equation (4):

$$L_t(X^{(t)}, y^{(t)}, W) = N_t^{-1} \sum_i n_i^{-1} \sum_k l_t(x_k^{(i)}, y_k^{(i)}, w_i) \quad (4)$$

The multi-task regularization term $\Omega$ is shown in Equation (5) as follows:

$$\Omega_t(W) = \frac{1}{2N_t} \sum_{i=1}^{N_t} \|w_i - \overline{w}^{(t-1)}\|_2^2 \quad (5)$$

The parameter $\|w\|_2$ denotes the $l_2$ norm of w and $\overline{w}^{(t-1)}$ represents the (running) mean of all previous instance models, which include all past values of the models of currently tracked or now lost targets (this is equivalent to summing all pairwise comparisons between target-specific models). Note that this formulation follows a mean-regularized multi-task learning formulation with the difference that this version of mean-regularized multi-task learning is designed for online learning in streaming scenarios. This regularization term induces a joint learning of all the target-specific appearance models and in addition promotes solutions where classifiers (past and present) are similar to each other.

This regularization thus prevents each detector from overfitting to individual object appearances and allows them to generalize across tasks (object instances) by modeling their latent commonalties (the appearance of the category), which also limits model drift. Another benefit of this regularization is that it learns a model that is more robust to false alarms, as they are likely to significantly differ from the mean, and, therefore, the corresponding trackers will be quickly under fitting and lose the object. In contrast, the correct detections will be tracked for longer as they share common appearance factors, thus contributing more to the category model.

The disclosed multi-task adaptation of target-specific models allows for reliable tracking, while limiting model drift and false alarms. In addition, we hypothesize that maintaining and adapting the generic pre-trained category-level detector should allow to lower the miss-rate by continuously specializing the global appearance model to the specific video stream, which might be non-stationary and significantly different from the offline pre-training data.

In fact, one can observe that the regularization term (i.e., see Equation (5)) already provides a theoretical justification to using the running average $\overline{w}^{(t)}$ as a single category-level detector. Indeed, once the detectors $w_i$ are updated in frame t, a new scene adapted detector can be readily available as shown in Equation (6) below:

$$\overline{w}^{(t)} = \frac{1}{\overline{N}_{t-1} + N_t} \left( \overline{N}_{t-1} \overline{w}^{(t-1)} + \sum_{i=1}^{N_t} w_i^{(t)} \right) \quad (6)$$

where $\overline{N}_{t-1} = \sum_{j=1}^{t-1} N_j$.

This approach can be interpreted as learning a category-level model from the average of instance-specialized models. As we use linear classifiers, this multi-task learning is akin to a "fusion" of exemplar-based models (e.g., Exemplar-SVMs). A major improvement is that the disclosed models are learned jointly and adapt continuously to both the data stream and other exemplars. This adaptation allows for limiting the drift of the category model. There is indeed, an "inertia" in the update due to the warm-starting of the trackers from the generic model. Furthermore, as the adapted model corresponds to a (potentially long) running average, the contribution of false alarms to the model should be limited, as false alarms are more likely to be tracked for less time thanks to our multi-task penalization.

The learning objective shown in FIG. 1 and Equation (3) can be optimized using SGD (Stochastic Gradient Descent), considering the frame data as a single mini-batch. Note that SGD also corresponds to the self tuning stochastic optimization module illustrated in FIG. 1. The disclosed approach is self-tuning, i.e., adapts its hyper-parameters as described below and also shown by the example pseudo-code in FIG. 4.

The updated equations are simple and efficient to compute as shown in Equations (7)-(9) below:

$$w_i^{(t)} = w_i^{(t-1)} - \eta_i^{(t)} \left( \gamma_i^{(t)} + \frac{\lambda_i^{(t)}}{N_t} \rho_i^{(t)} \right) \quad (7)$$

$$\gamma_i^{(t)} = \frac{1}{n_i} \sum_{k=1}^{n_i} \frac{\partial l}{\partial w}(x_k^{(i)}, y_k^{(i)}, w_i^{(t-1)}) \quad (8)$$

$$\rho_i^{(t)} = w_i^{(t-1)} - \overline{w}^{(t-1)} \quad (9)$$

where $\eta_i^{(t)}$ are the learning rates and $\lambda_i^{(t)}$ are the regularization parameters. Equations (3), (5), (6), and (7) show that the learning process is a joint one: the update of a tracker includes a contribution of all the other trackers (both current and past ones). This online first order optimization algorithm is well-suited to our streaming scenario, as the update of each specific model only relies on the current frame and the current running average of all models.

There are two critical hyper-parameters, which should be taken into account: the learning rate $\eta_i^{(t)}$ and the regularization factor $\lambda_i^{(t)}$. In contrast to previous TBD implementations, the present embodiments do not assume stationary and manually fixed parameters set per video. Instead, embodiments can be configured wherein the learning rates are automatically set per-frame and per-target utilizing a strategy similar to, for example, a PA-II passive-aggressive strategy. Equation (10) below is one example of this approach:

$$\eta_i^{(t)} = \frac{n_i^{-1} \sum_k l(x_k^{(i)}, y_k^{(i)}, w_i^{(t-1)})}{\varepsilon + n_i^{-1} \sum_k \|x_k\|^2} \qquad (10)$$

with $\varepsilon=10^{-6}$ in experimental embodiments.

Below is example pseudo-code, which can be implemented for a self-tuning stochastic optimization algorithm, in accordance with an alternative embodiment.

| Self-tuning stochastic optimization |
|---|
| 1: Input: $w_i^{(t-1)}$, $\{(x_k^{(i)}, y_k^{(i)}), k = 1 : n_i\}$ with $\hat{x}_i^{(t)}$ the current location estimate of i |
| 2: Output: $w_i^{(t)}$ |
| 3:     Compute learning rate $ni_i^{(t)}$ (Eq. 10) |
| 4:     for $\lambda \in \{1.0, 0.5, 0.1, 10^{-4}\}$ do |
| 5:         Compute tentative $w_{(t)}$ (Eq. 7) |
| 6:         Run detector $w_i^{(t)}$ |
| 7:         Compute rank of detection matching $\hat{x}_i^{(t)}$ (if any) |
| 8:         if rank is 1 then |
| 9:             return $w_i^{(t)}$ |
| 10:        end if |
| 11:    end for |
|        # In case no update yielded rank 1 |
| 12:    return $w_i^{(t)}$ with best ranked prediciton |

For the regularization parameter $\lambda_i^{(t)}$, a greedy search can be made for the least-over-fitting (i.e., largest) value in $\{1.0, 0.5, 0.1, 10^{-4}\}$ that yields an updated tracker model that can reliably match the current location $\hat{x}_i^{(t)}$ and is efficient in practice, as it re-uses the already extracted frame-level computations (e.g., in particular, feature extraction).

Finally, a momentum term of 0.9 can be employed as shown in Equation (1) below:

$$\Delta_t \leftarrow \Delta_t + 0.9 \times \Delta_{t-1} \qquad (11)$$

In Equation (11), $$\Delta_t = \gamma_i^{(t)} + \frac{\lambda_i}{N_t}\rho_i^{(t)}$$

(also see Equation (7)) which is employed in SGD applications and implements a form of short-term memory useful in tracking.

Figure 4:
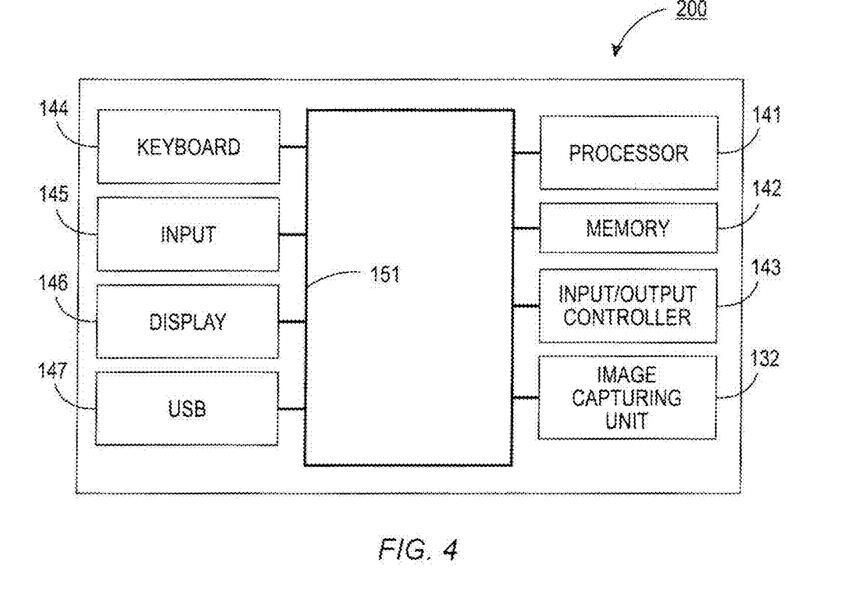
FIG. 4 illustrates a schematic view if a computer system, in accordance with an embodiment.

FIG. 4 illustrates example images 61, 63, 65 from a Pascal VOC 2007 detection challenge and an image 67 indicative of KITTI tracking benchmarks, in accordance with an experimental embodiment. There is a striking difference in visual appearance between the two image datasets as will be explained in greater detail below.

The embodiments are described at least in part herein with reference to flowchart illustrations, pseudo-code depictions, and/or block diagrams of methods, systems, and computer program products and data In an experimental embodiment, tests were performed to evaluate car tracking performance on 21 training videos of the publicly-available KITTI tracking challenge (see: http://www.cvlibs.net/datasets/kitti/eval_tracking.php). Such videos were recorded from a moving platform while driving in and around the city of Karlsruhe in Germany. This is a challenging dataset designed to investigate how computer vision algorithms perform on real-world data typically found in robotics and autonomous driving applications. These sequences have a high resolution of 1242×375 and vary significantly in terms of number of frames, number of objects, camera motion, and imaging conditions.

The training videos were used in order to compare to the different baselines and existing related approaches we implemented. The ground truth tracks of the test videos are not publicly available and the KITTI challenge evaluation server does not allow for repeated submissions. While the KITTI benchmark provides a tracking training set, it should be noted that the disclosed approach relies on detectors pre-trained on a separate dataset, treats the KITTI videos as unseen, and performs unsupervised online domain adaptation.

Therefore, the disclosed embodiments do not use in any way the available ground truth tracks on these sequences. This ground truth is used only to evaluate performance after the trackers have finished parsing the videos. Trackers were run on each video independently, as (i) this corresponds to the standard practice in tracking evaluation, and (ii) the disclosed online algorithm depends on the order of the frames, so evaluating on an arbitrary concatenation of all videos would depend vastly on the order in which our algorithm sees the videos.

A generic car detector was pre-trained with respect to training images from a standard Pascal VOC 2007 detection challenge. As this dataset is general-purpose, it is reasonable to expect it to yield pre-trained models likely to transfer to more specific tasks/domains, to a certain extent at least (which are measured in experiments of this type). On the other hand, FIG. 5 highlights some striking differences between datasets and anticipates the difficulty of transfer.

The pre-training of, for example, the detector 12 shown in FIG. 1 can be performed off-line via batch logistic regression using, for example, libinear, with hard negative mining. Features of a light-weight version of Fisher Vectors (FV) dubbed "Mini-FVs"can be employed, which has been shown to be a good compromise between high accuracy and efficiency. In one experimental embodiment, a mini-FV model has yielded close to 40% Average Precision (AP), which is 18% below prior art results for a fraction of the cost. Note that although logistic regression provides calibrated probabilities in theory, we found that our pre-training tends to yield an overconfident detector. Therefore, a simple re-calibration step can be applied with respect to the pre-training data to operate at a 33% recall (i.e., a third of the objects are detected on the Pascal test set), which yields around 60% precision on the Pascal test set.

In some experimental embodiments, the KITTI evaluation protocol can be followed by using the CLEAR MOT metrics including, for example, the MOT Accuracy (MOTA, composed of the false positive and negative rates, as well as the number of identity switches). MOT Precision (MOTP), Fragmentation (FRAG), and IDentity Switches (IDS)—complemented by the Mostly Tracked (MT) and Partly Tracked (PT) ratios, as well as Precision (P), Recall (R), and False Alarm Rate (FAR). The public evaluation code (http://kitti.is.tue.mpg.de/kitti/devkit_tracking.zip) is available from the KITTI tracking benchmark.

The ODAMOT approach can be compared to other TBD algorithms, such as, for example, off-line Association Based Tracking (ABT) type methods ("DP MCF" and "G TBD"), an on-line Category-Free Tracker (CFT), and an on-line Category-to-Instance Tracker (CIT). Note that for fair comparisons, the authors' original tracking code can be used and combined with our own detections, except for the OFT and CIT baselines for which no public code is available, so an original implementation may be used. The CFT baseline does not include warm-starting from a pre-trained detector (using 0-based initialization instead), does not involve multi-task regularization (target models are independent), and additionally does not include online adaptation of the pre-trained detector.

The CIT baseline is the same approach as CFT, except that the trackers are warm-started from the pre-trained category-level detector. Such comparisons allow us to quantify the improvement related to the different tracking algorithms. It also allows for an assessment of the robustness to noisy detections, something not evaluated yet by the tracking community, as most existing works generally leverage high-quality detections obtained from expensive state-of-the-art detectors trained on very similar data. Finally, the disclosed approach can be seen as a significant generalization and improvement of the CFT and CIT baselines. Such comparisons are also useful to understand the importance of different contributions via ablative analysis.

Table 1 below contains all the tracking performance metrics for the different methods compared. Note that additional experiments are also reported, prefixed by "B-", which correspond to changing the pre-training data from Pascal VOC 2007 to the KITTI object detection benchmark. This pre-training data is different than the KITTI tracking video sequences, but strongly related. Therefore, these additional experiments provide an indication of the gap between the disclosed domain adaptation experiments and the more favorable but, in practice, less likely scenario of training on data directly related to the end application.

First, we can observe that our method consistently outperforms all others in terms of the overall MOT Accuracy, which is composed of the false negative rate, false positive rate, and number of identity switches. This means that ODAMOT allows to hit a good trade-off between precision and recall. Indeed, Table 1 indicates that ODAMOT allows to track (mostly and partly) more targets than the other methods by improving recall while maintaining a high precision. This provides evidence supporting the disclosed embodiments involving a multi-task on-line adaptation that allows us to gradually discover and track more targets while limiting model drift, although this comes at the cost of an increase in identity switches and track fragmentation. In more details, it can be seen that the category-to-instance adaptation alone (CIT) allows a relative MOTA improvement of 14% compared to the "naive" category-free baseline (CFT). Adding the instance-to-category adaptation yields a further relative improvement of 8% w.r.t. CIT, while altogether providing a 23% improvement relative to CFT.

Second, it can be seen that prior art off-line ABT methods (e.g., DP MCF and G TBD) suffer greatly from the low quality of the pre-trained detector. Although they optimize data association across the entire video sequences, they only manage to generate the few "easy" tracks as evidenced by their high precision (as measured by the high MOTP, P, and low FAR) for a low recall (as measured by the low MOTA, MT, PT, and R metrics). This is not simply an issue caused by the pre-training on unrelated data, as suggested by the second set of results ("B-") depicted in Table 1.

Although the performance of these ABT methods is vastly improved thanks to the use of a better detector, the disclosed ODAMOT method pre-trained on unrelated data still outperforms these other methods (e.g., a relative improvement of 33% between ODAMOT and the best ABT method B-G TBD). This confirms that the performance of ABT methods is vastly driven by the quality of the detections, while the disclosed online domain adaptation approach can efficiently extract useful information from an initially imperfect detector. Note that implementation of the disclosed embodiments can also benefit strongly from related training data (e.g., B-ODAMOT obtains the best MOTA performance and yields a 65% improvement relative to ODAMOT). Therefore, this suggests that the disclosed adaptation can still be useful in a more favorable detection regime. In this case, the category-to-instance adaptation seems crucial (B-CIT), while the instance-to-category provides a further significant gain. In particular, using the naive "B-CFT" strategy results in strong false alarms that are tracked reliably for a long time, thus yielding a high false alarm rate.

Finally, in another experimental embodiment, the impact of the self-tuning part of ODAMOT was evaluated by replacing the automatic learning rate and regularization parameters with the best constant parameters according to MOTA. A performance of 17.1% MOTA was observed with fixed parameters. Therefore, utilizing a self-tuning stochastic optimization application as discussed herein can yield a 15% relative improvement in MOTA. This confirms that adapting hyper-parameters online can further improve tracking performance.

As can be appreciated by one skilled in the art, embodiments can be implemented in the context of a method, data processing system, or computer program product. Accord-

TABLE 1

| Method | MOTA | MOTP | MT | PT | R | P | FAR | IDS | FRAG |
|---|---|---|---|---|---|---|---|---|---|
| DP MCF | 1.8% | 74.7% | 0.0% | 1.2% | 1.9% | 94.2% | 0.4% | 6 | 26 |
| G TBD | 7.4% | 71.8% | 0.2% | 10.9% | 9.5% | 82.4% | 6.3% | 9 | 138 |
| CFT | 16.0% | 72.4% | 0.7% | 29.9% | 21.1% | 80.7% | 15.7% | 57 | 167 |
| CIT | 18.2% | 73.9% | 1.1% | 31.7% | 21.8% | 86.1% | 10.9% | 40 | 193 |
| ODAMOT | 19.7% | 74.5% | 1.1% | 34.3% | 23.5% | 86.4% | 11.5% | 55 | 232 |
| B-DP MCF | 9.7% | 72.1% | 0.0% | 11.9% | 10.4% | 93.6% | 2.2% | 52 | 314 |
| B-G TBD | 14.8% | 71.4% | 0.5% | 21.4% | 16.8% | 89.5% | 6.2% | 11 | 279 |
| B-CFT | 13.2% | 69.2% | 3.3% | 58.1% | 43.5% | 59.3% | 93.1% | 236 | 620 |
| B-CIT | 31.1% | 74.3% | 2.5% | 47.1% | 35.8% | 88.5% | 14.4% | 192 | 506 |
| B-ODAMOT | 32.7% | 72.7% | 3.5% | 55.3% | 40.3% | 84.4% | 23.3% | 200 | 556 | ingly, embodiments may take the form of an entire hardware embodiment. an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wimax, 802.xx, and cellular network, or the connection may be made to an external computer via most third party supported networks (for example, through the Internet utilizing an Internet Service Provider).

The embodiments are described at least in part herein with reference to a flow chart illustrations, pseudo-code depictions, and/or block diagrams of methods, systems, and computer program products and data structures according to embodiments of the invention. It will be understood that each block of the illustrations, and combinations of blocks, and/or lines of pseudo-code can be implemented by computer program instructions. These computer program instructions may be provided to a processor of a general-purpose computer, special purpose computer, or other programmable data processing apparatus to produce a machine, such that the instructions, which execute via the processor (e.g., processor 18 shown in FIG. 1, processor 141 depicted in FIG. 4, etc.) of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 5:
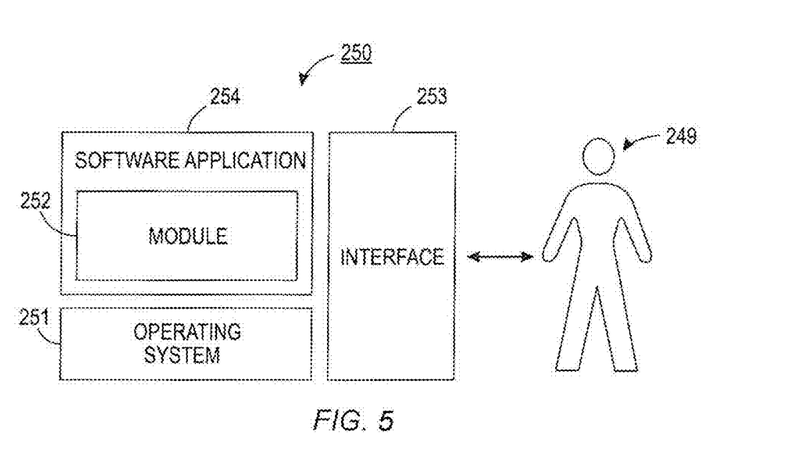
FIG. 5 illustrates a schematic view of a software system including a module, an operating system, and a user interface, in accordance with an embodiment.

FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. Note that the image capturing unit or camera(s) 132 can be deployed as or with, for example, the video camera 16 shown in FIG. 1 and discussed herein. The processor 141 shown in FIG. 4 is analogous to processor 18 shown in FIG. 1. Memory 142 illustrated in FIG. 4 is also similar or analogous to the memory 20 depicted in FIG. 1.

Figure 6:
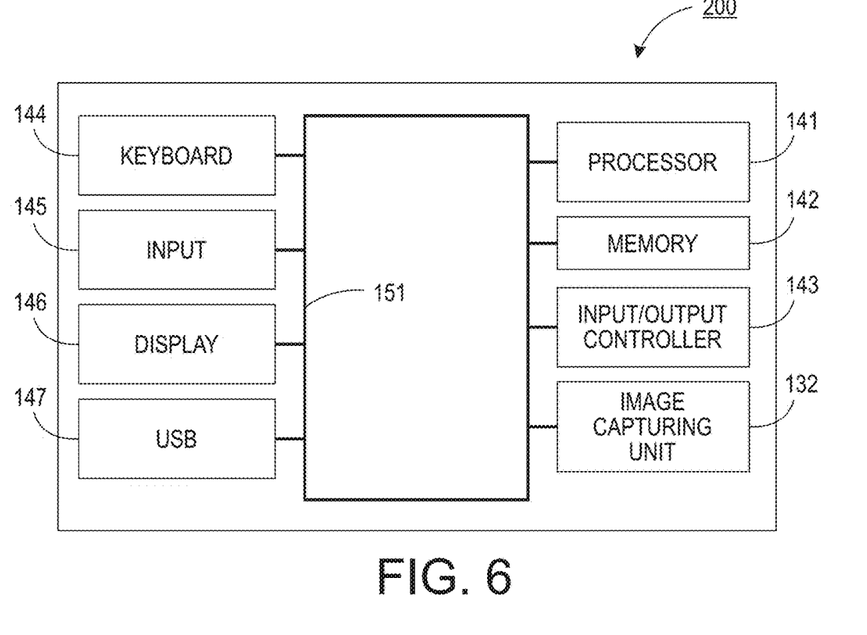
Figure 7:
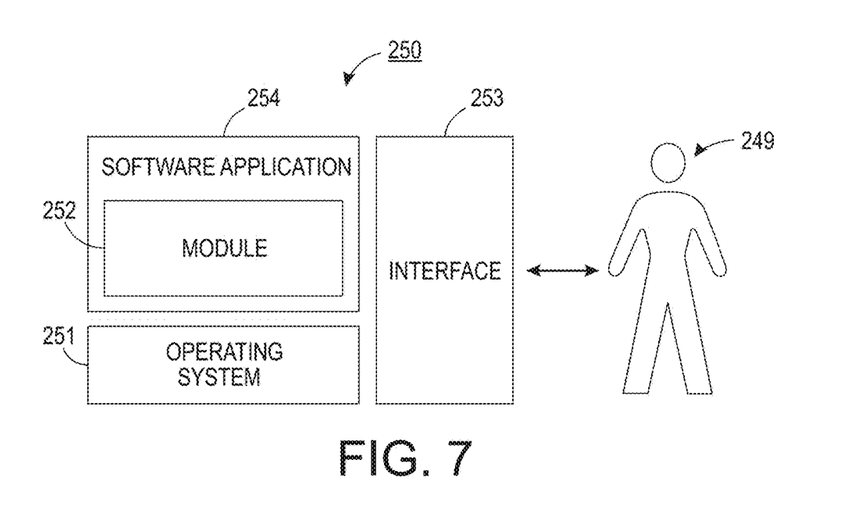

FIG. 7 illustrates a computer software system 250 for directing the operation of the data-processing system 200 depicted in FIG. 6. The software application 254 can be stored, for example, in memory 142. The computer software system 250 generally includes the module 252. The computer software system 250 also includes a kernel or operating system 251 and a shell or interface 253. One or more application programs, such as the software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include a module 252 that can be implemented as, for example, module(s) 12 shown in FIG. 1 and discussed herein. That is, the module 252 may implement the pre-trained object detector module 12 depicted in FIG. 1 including instructions for online domain adaptation 14, the learning objective, the self-tuning stochastic optimization shown in FIG. 1, and so on.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 5 can thus implement instructions such as those shown and described and illustrated herein (e.g., the logical steps or operations of method 22 shown in FIG. 2, the pseudo-code described herein in FIGS. 3-4, etc.). The pre-trained object detector 12 shown in FIG. 1 is also an example of a module.

FIGS. 4-5 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. For example, in one embodiment a method is disclosed for online domain adaptation for multi-object tracking. Such a method can include the steps or logical operations of capturing video of an area of interest with a video camera, and analyzing the video with a pre-trained object detector utilizing online domain adaptation including convex multi-task learning and an associated self-tuning stochastic optimization procedure to jointly adapt online all trackers associated with the pre-trained object detector and a pre-trained category-level model from the trackers in order to efficiently track a plurality of objects in the video captured by the video camera.

In one embodiment, the self-tuning stochastic optimization procedure can include self-tuning of hyper-parameters. In some embodiments, a step or logical operation can be provided for selecting the hyper-parameters including a learning rate and a regularization factor. In yet another embodiment, the pre-trained object detector can be implemented as a category-level detector that moves from category to instances and back. In still another embodiment, convex multi-task learning can include logistic regression and hard negative mining.

In another embodiment, a system for online domain adaptation for multi-object tracking can be implemented, which includes an image capturing unit that captures video of an area of interest, and a pre-trained object detector for analyzing the video utilizing online domain adaptation including convex multi-task learning and an associated self-tuning stochastic optimization procedure to jointly adapt online all trackers associated with the pre-trained object detector and a pre-trained category-level model from the trackers in order to efficiently track a plurality of objects in the video captured by the image capturing unit.

In another embodiment, a system for online domain adaptation for multi-object tracking can be implemented. Such a system can include, for example, at least one processor and a computer-usable medium embodying computer program code, the computer-usable medium capable of communicating with the processor(s). The computer program code can include instructions executable by the at least one processor and configured, for example, for: capturing video of an area of interest with a video camera; and analyzing the video with a pre-trained object detector utilizing online domain adaptation including convex multi-task learning and an associated self-tuning stochastic optimization procedure to jointly adapt online all trackers associated with the pre-trained object detector and a pre-trained category-level model from the trackers in order to efficiently track a plurality of objects in the video captured by the video camera.

It will be appreciated that variations of the above-disclosed and other features and functions, or alternatives thereof, may be desirably combined into many other different systems or applications. It will also, be appreciated that various presently unforeseen or unanticipated alternatives, modifications, variations or improvements therein may be subsequently made by those skilled in the art, which are also intended to be encompassed by the following claims.

The invention claimed is:

1. A method for online domain adaptation for multi-object tracking, said method comprising:
   pre-training an object detector and a category-level model, wherein said pre-trained object detector is trained offline for at least one category of interest using a general-purpose labeled dataset and wherein said pre-trained object detector is associated with a plurality of trackers;
   capturing video of an area of interest with a video camera; and
   analyzing said video with said pre-trained object detector utilizing online domain adaptation including convex multi-task learning and an associated self-tuning stochastic optimization procedure, wherein said convex multi-task learning and said associated self-tuning stochastic optimization procedure jointly adapt online all trackers among said plurality of trackers associated with said pre-trained object detector and said pre-trained category-level model from said trackers to efficiently track a plurality of objects in said video captured by said video camera and wherein said associated self-tuning stochastic optimization procedure includes a use of learning rates and regularization parameters in which an update of at least one tracker of among said trackers includes a contribution of all other trackers among said trackers including both current and past trackers thereof, and wherein said learning rates are automatically set per-frame and per-target with respect to said video.

2. The method of claim 1 wherein said self-tuning stochastic optimization procedure comprises self-tuning of hyper-parameters.

3. The method of claim 2 further comprising selecting said hyper-parameters including at least two critical hyper-parameters comprising a learning rate among said learning rates and a regularization factor among said regularization parameters.

4. The method of claim 2 wherein said convex multi-task learning comprises logistic regression and hard negative mining.

5. The method of claim 1 wherein said pre-trained object detector comprises a category-level detector that moves from said at least one category of interest to instances and back.

6. The method of claim 5 wherein said convex multi-task learning comprises logistic regression and hard negative mining.

7. The method of claim 6 wherein said pre-trained object detector comprises a category-level detector that moves from said at least one category of interest to instances and back.

8. A system for online domain adaptation for multi-object tracking, said system comprising:
an image capturing unit that captures video of an area of interest; and
a pre-trained object detector that is pre-trained offline for at least one category of interest using a general-purpose labeled dataset and wherein said pre-trained object detector is associated with a plurality of trackers, wherein said pre-trained object detector analyzes said video utilizing online domain adaptation including convex multi-task learning and an associated self-tuning stochastic optimization procedure, wherein said convex multi-task learning and said associated self-tuning stochastic optimization procedure jointly adapt online all trackers among said plurality of trackers associated with said pre-trained object detector and a pre-trained category-level model from said trackers to efficiently track a plurality of objects in said video captured by said image capturing unit and wherein said associated self-tuning stochastic optimization procedure includes a use of learning rates and regularization parameters in which an update of at least one tracker of among said trackers includes a contribution of all other trackers among said trackers including both current and past trackers thereof, and wherein said learning rates are automatically set per-frame and per-target with respect to said video.

9. The system of claim 8 wherein said self-tuning stochastic optimization procedure comprises self-tuning of hyper-parameters.

10. The system of claim 9 wherein said convex multi-task learning comprises logistic regression and hard negative mining.

11. The system of claim 9 wherein said hyper-parameters include at least two critical hyper-parameters comprising a learning rate among said learning rates and a regularization factor from among said regularization parameters.

12. The system of claim 11 wherein said pre-trained object detector comprises a category-level detector that moves from said at least one category of interest to instances and back.

13. The system of claim 8 wherein said convex muti-task learning comprises logistic regression and hard negative mining.

14. The system of claim 13 wherein said pre-trained object detector comprises a category-level detector that moves from said at least one category of interest to instances and back.

15. A system for online domain adaptation for multi-object tracking, said system comprising:
at least one processor; and
a non-transitory computer-usable medium embodying computer program code, said computer-usable medium capable of communicating with said at least one processor, said computer program code comprising instructions executable by said at least one processor and configured for:
pre-training an object detector and a category-level model, wherein said pre-trained object detector is trained offline for at least one category of interest using a general-purpose labeled dataset and wherein said pre-trained object detector is associated with a plurality of trackers:
capturing video of an area of interest with a video camera; and
analyzing said video with said pre-trained object detector utilizing online domain adaptation including convex multi-task learning and an associated self-tuning stochastic optimization procedure, wherein said convex multi-task learning and said associated self-tuning stochastic optimization procedure jointly adapt online all trackers among said plurality of trackers associated with said pre-trained object detector and said pre-trained category-level model from said trackers to efficiently track a plurality of objects in said video captured by said video camera and wherein said associated self-tuning stochastic optimization procedure includes a use of learning rates and regularization parameters in which an update of at least one tracker of among said trackers includes a contribution of all other trackers among said trackers including both current and past trackers thereof, and wherein said learning rates are automatically set per-frame and per-target with respect to said video.

16. The system of claim 15 wherein said self-tuning stochastic optimization procedure comprises self-tuning of hyper-parameters.

17. The system of claim 16 wherein said instructions further comprise selecting said hyper-parameters including at least two critical hyper-parameters comprising a learning rate among said learning rates and a regularization factor from said regularization parameters.

18. The system of claim 17 wherein said pre-trained object detector comprises a category-level detector that moves from said at least one category of interest to instances and back.

19. The system of claim 16 wherein said pre-trained object detector comprises a category-level detector that moves from said at least one category of interest to instances and back, and wherein said convex multi-task learning comprises logistic regression and hard negative mining.

20. The system of claim 15 wherein said convex multi-task learning comprises logistic regression and hard negative mining.

* * * * *

UNITED STATES PATENT AND TRADEMARK OFFICE
CERTIFICATE OF CORRECTION

PATENT NO. : 9,984,315 B2
APPLICATION NO. : 14/704350
DATED : May 29, 2018
INVENTOR(S) : Adrien Gaidon and Eleonora Vig Page 1 of 1

It is certified that error appears in the above-identified patent and that said Letters Patent is hereby corrected as shown below:

On the Title Page

Item (73) Please change the Assignee name shown from "Condruent Business Services, LLC" to the correct name of -- Conduent Business Services, LLC --

Signed and Sealed this
Tenth Day of July, 2018

Andrei Iancu
*Director of the United States Patent and Trademark Office*